United States Patent
Chuang et al.

(10) Patent No.: US 7,860,099 B2
(45) Date of Patent: Dec. 28, 2010

(54) METHOD FOR MANAGING AND SETTING MANY NETWORK DEVICES

(75) Inventors: Cheng-Hsien Chuang, Hsinchu (TW); Chih-Ta Lin, Hsinchu (TW)

(73) Assignee: Alpha Networks Inc., Hsinchu (TW)

( * ) Notice: Subject to any disclaimer, the term of this patent is extended or adjusted under 35 U.S.C. 154(b) by 398 days.

(21) Appl. No.: 11/642,777

(22) Filed: Dec. 21, 2006

(65) Prior Publication Data

US 2008/0155047 A1 Jun. 26, 2008

(51) Int. Cl.
- H04L 12/28 (2006.01)
- H04L 12/56 (2006.01)
- H04J 3/26 (2006.01)
- G06F 15/16 (2006.01)
- G06F 15/173 (2006.01)

(52) U.S. Cl. ............ 370/392; 370/395.52; 370/400; 370/432; 709/209; 709/223

(58) Field of Classification Search ............ 370/426, 370/392, 400, 395.52, 432; 709/208, 233
See application file for complete search history.

(56) References Cited

U.S. PATENT DOCUMENTS

| | | | |
|---|---|---|---|
| 7,234,163 B1* | 6/2007 | Rayes et al. | 726/22 |
| 2004/0034714 A1* | 2/2004 | Garakani et al. | 709/238 |
| 2005/0013310 A1* | 1/2005 | Banker et al. | 370/401 |
| 2005/0086332 A1* | 4/2005 | Nakazawa | 709/223 |
| 2006/0041650 A1* | 2/2006 | Luo et al. | 709/223 |
| 2006/0047800 A1* | 3/2006 | Caveney et al. | 709/223 |
| 2006/0178131 A1* | 8/2006 | Huotari et al. | 455/410 |
| 2006/0230309 A1* | 10/2006 | Kromer et al. | 714/11 |
| 2007/0171844 A1* | 7/2007 | Loyd et al. | 370/254 |
| 2007/0189190 A1* | 8/2007 | Feng et al. | 370/254 |
| 2007/0271363 A1* | 11/2007 | Ross et al. | 709/223 |

* cited by examiner

*Primary Examiner*—Jayanti K Patel
*Assistant Examiner*—Saad Hassan
(74) *Attorney, Agent, or Firm*—WPAT, PC; Justin King (57) ABSTRACT

The present invention discloses a method for managing and setting many network devices, and the method is applied in a network management system. The network management system includes a management server and a plurality of network devices. The management server searches a network device connected to the management server and specifies one of the network devices connected to the management server as a master network device, and then searches all network devices that can be connected to the master network device. The searched network devices are set as candidate network devices and at least one candidate network device is set as a slave network device of the master network device, such that a single IP address of the master network device can be used for managing the slave network devices, and the management server can be used for managing many network devices distributed at different places.

5 Claims, 9 Drawing Sheets

| CaS ID | IP-IF ID | CaS MAC | Local-MAC-Set | Role | Device Name |
|---|---|---|---|---|---|
| *1:1* | *1* | D | *{D, E, F}* | CaS | CaS 1 |
| *1:2* | *3* | F | *{D, E, F}* | CaS | CaS 1 |
| *2:1* | *3* | G | *G* | CaS | CaS 2 |
| *3:1* | *3* | H | *{H, I, J}* | CaS | CaS 3 |

| CaS ID | IP-IF ID | CaS MAC | Local-MAC-Set | Role | Device Name |
|---|---|---|---|---|---|
| 1:1 | 1 | D | {D, E, F} | MS | MS 1 |
| 1:2 | 3 | F | {D, E, F} | | |
| 2:1 | 3 | G | G | MS | MS 2 |
| 3:1 | 3 | H | {H, I, J} | CaS | CaS 3 |

METHOD FOR MANAGING AND SETTING MANY NETWORK DEVICES

FIELD OF THE INVENTION

The present invention relates to a method for managing and setting many network devices, and more particularly to a method for managing and setting many network devices that uses a single IP address of a master network device for managing several slave network devices.

BACKGROUND OF THE INVENTION

In recent years, network technologies are developed rapidly and various network devices and equipments are introduced instantly and used extensively in our life as well as working environments of different industries. This trend not only expedites the speed and efficiency of the distribution of information, but also brings tremendous convenience to our life and work. At present, many corporations are using local area network or Internet for the transmissions of internal and external information. However, there are so many different network devices and equipments that bring many management problems to network administrators. Therefore, it is one of the key points for network administrators and managers to find a way of managing many network devices on a network.

In general, a network device on the network can be set and managed by one of the following methods:

1. A method adopts a simple network management protocol (SNMP), such that network administrators can use a computer at a remote end to logon a network to enter into a setup menu of each network device for setting, modifying and managing the network devices.

2. Another method adopts a TELNET protocol, such that network administers can set and manage each network device via Internet.

3. A further method builds a web server in each network device, such that network administrators can use a web browser to set and manage each network device via Internet.

From the methods above, most existing network management systems collect the information of each network device through different management protocols by executing network software of a server system for the management purpose. However, existing management methods still have the following problems:

1. All managed network devices require an individual IP addresses and none of the network devices can have the same IP address of another network device.

2. Network administrators must know the IP address of each network device in order to correctly enter into the setup menu of each network device. From the description above, network administrators not only needs to know the preset IP address of each network device, but also needs to have the concept and capability of setting and managing the IP address.

3. When each network device is set up or modified, users need to check the IP address of the first network device in order to enter into a setup menu for setting the network device, and then exit the menu. Users need to find out the IP address of the next network device to logon and set up the next network device, and then exit the menu. The same process is repeated until all network devices are set. If there are ten network devices, administrators have to go through the same setup procedure for ten times or modify the foregoing setup (for both management end and user end) for any change to the network devices. Such arrangement definitely wastes tremendous manpower and time.

4. Although the foregoing setup and management methods are considered as a central management, these methods substantially belong to a distributed management since the setup of each network device is independent.

Therefore, it is one of the important subjects of the management of network devices to find a way of simplifying the network management and setup process without changing a user's original using habits, so that the setup and management operations of the network devices can be simpler to reduce the operating time, and the management end can manage many network devices distributed at different places more quickly.

SUMMARY OF THE INVENTION

In view of the foregoing shortcomings of the setup and management of conventional network devices, the inventor of the present invention based on years of experience to conduct extensive researches and experiments, and finally invented a method for managing and setting many network devices in accordance with the present invention.

Therefore, it is a primary objective of the present invention to provide a method for managing and setting the foregoing network devices, and the method is applied in a network management system, and the network management system comprises a management server and a plurality of network devices. The management server searches a network device connected to the management server first, and specifies one of the network devices connected to the management server as a master network device, and then searches all network devices that can be connected to the master network device, and sets the searched network devices as candidate network devices, and specifies at least one candidate network device as a slave network device of the master network device, such that a single IP address of the master network device can be used for managing the slave network devices, and the management server can easily manage different network devices distributed at different places.

Another objective of the present invention is to provide a management method for many network devices, and the method is applied to a master network device, such that if the master network device receives a first management packet transmitted from its connected management server, the first management packet is packed as a second management packet, and the second management packet is sent to a slave network device connected to the master network device. If the master network device receives a first notice packet transmitted from the slave network device, the first notice packet is packed into a second notice packet, and the second notice packet is sent to the management server, so that the management server simply needs to use a single IP address of the master network device to manage the slave network devices connected to the master network device and achieve the effect of managing different network devices distributed at different places.

To make it easier for our examiner to understand the objective, technical characteristics and effects of the present invention, a preferred embodiment will be described with accompanying drawings as follows:

DETAILED DESCRIPTION OF THE PREFERRED EMBODIMENTS

Figure 1:
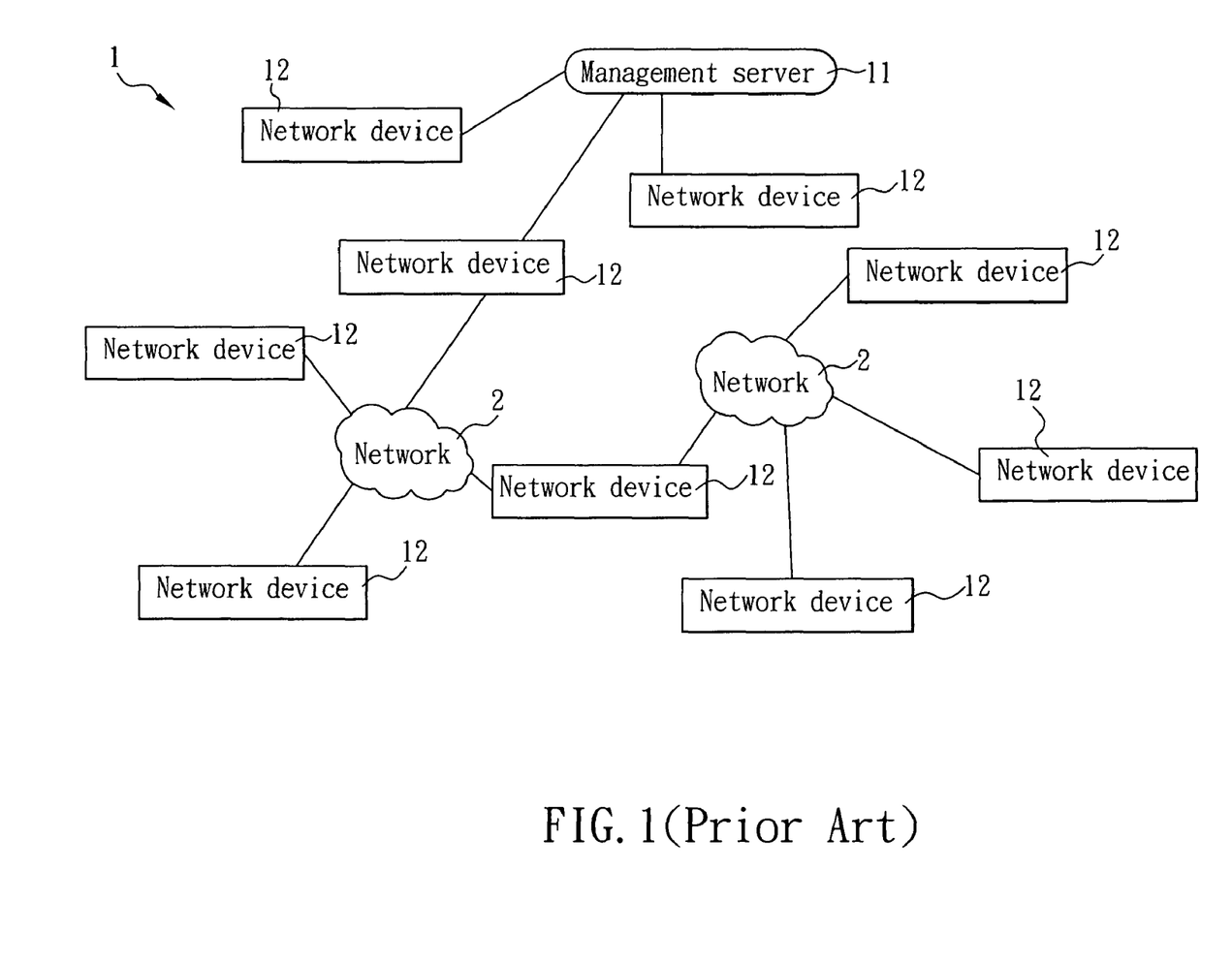
FIG. 1 is a schematic view of a general network management system.
Figure 2:
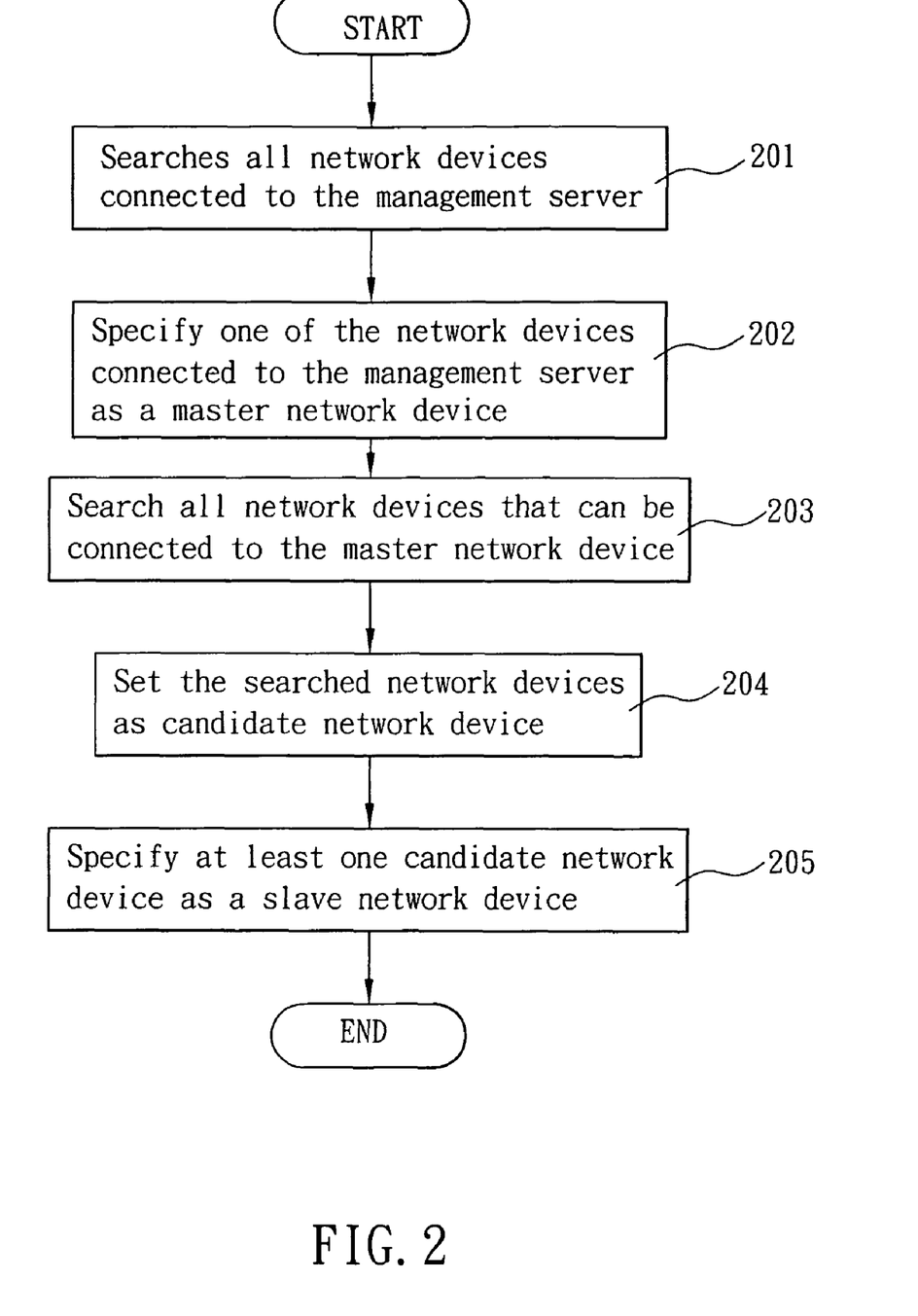
FIG. 2 is a flow chart of a method of the present invention.

Referring to FIGS. 1 and 2 for a method for managing and setting many network devices, the method is applied in a network management system 1, and the network management system 1 comprises a management server 11 and a plurality of network devices 12, and the network device 12 could be a network switch separately connected to a plurality of networks 2 (such as a virtual local network, VLAN), and the method comprises the following steps:

(201) The management server 11 searches all network devices 12 that can be connected to the management server 11 and counts the quantity of network devices 12 connected to the management server 11 on the network 2.

Figure 5:
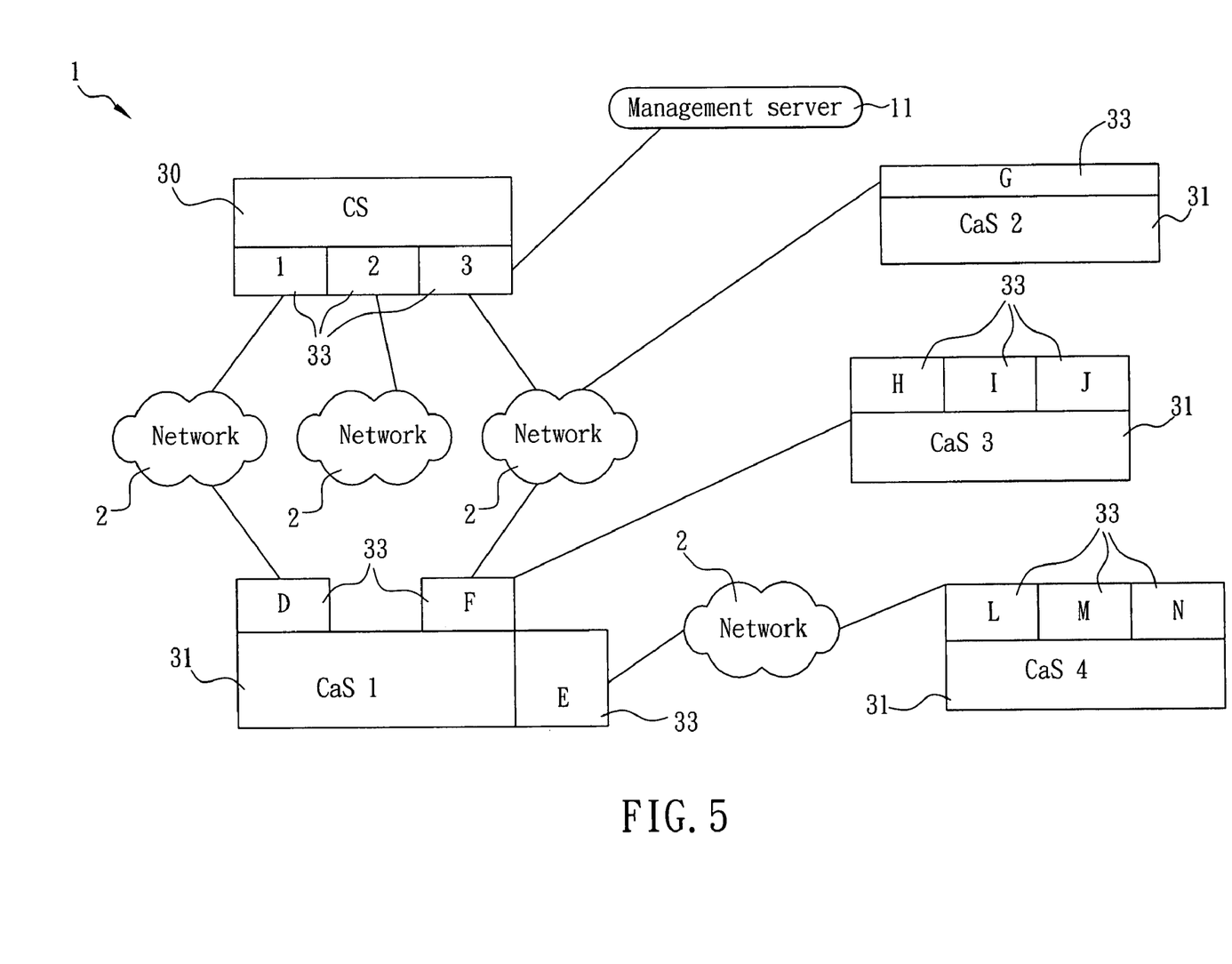
FIG. 5 is a schematic view of a network management system after selecting a candidate network device in accordance with the present invention.

(202) The management server 11 specifies one of the network devices 12 connected to the management server 11 as a master network device 30 (as shown in FIG. 5).

(203) The master network device 30 searches all network devices 12 that can be connected to the master network device 30.

Figure 3:
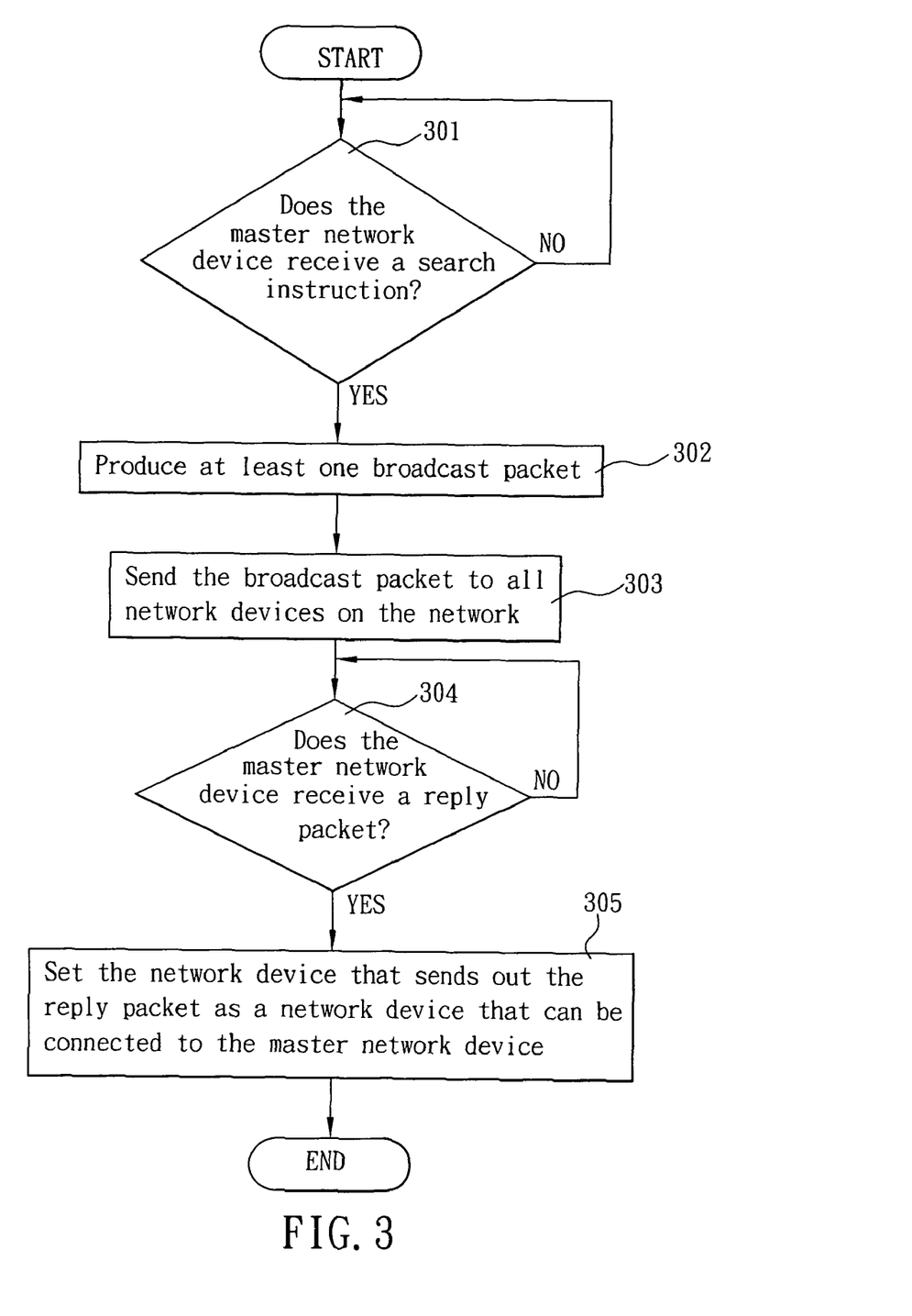
FIG. 3 is a flow chart of searching a network device in accordance with the present invention.

Referring to FIG. 3 for a preferred embodiment of the present invention, all network devices 12 connected to the master network device 30 are searched by the master network device 30 by the following steps:

(301) Firstly, it is determined whether or not the master network device 30 has received a search instruction transmitted from other network devices 12; if yes, go to Step (302), or else go to Step (301).

Step (302): The master network device 30 produces at least one broadcast packet.

Step (303): The broadcast packet is sent from at least one interface 33 of the master network device 30 to a network 2 connected to the interface 33, so that the broadcast packet can be sent to all network devices 12 on the network 2 (as shown in FIG. 5).

In the present invention, the broadcast packet comprises a source address and a multicast address, and the source address is a physical address of the master network device 30. If the master network device 30 is a level-2 network device (L2 Device), the physical address will be a media access control address (MAC Address) of the master network device 30. If the master network device 30 is a level-3 network device (L3 Device), the physical address will be a media access control address (MAC Address) of an interface 33 of the master network device 30, and the master network device 30 will send the broadcast packet to the interface 33 that matches said source address according to the source address, and will send the broadcast packet to a network 2 connected to the interface 33 according to the multicast address, such that all network devices 12 on the network 2 can receive the broadcast packet.

Step (304): This step determines whether or not the master network device 30 receives a reply packet from the interface 33; if yes, go to Step (305), or else go to Step (304).

Step (305): The network device 12 that sends out the reply packet is set as a network device 12 that can be connected to the master network device 30, so as to search for all network devices 12 that can be connected to the master network device 30.

Step (204): The master network device 30 sets the searched network devices 12 as candidate network devices 31 (as shown in FIG. 5).

Figure 4:
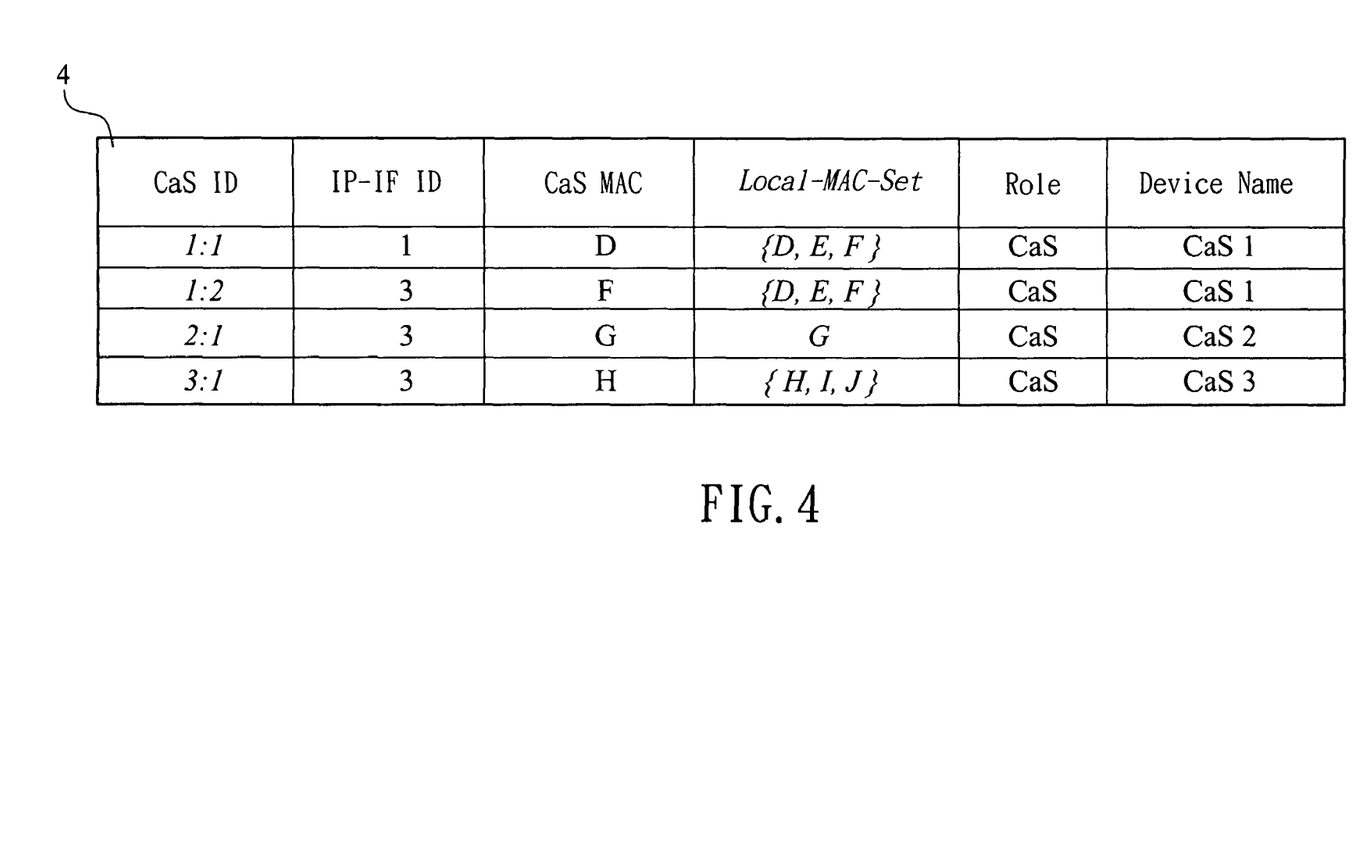
FIG. 4 is a first lookup table of network devices of the present invention.

To set the network devices 12 as candidate network devices 31 in the present invention, the master network device 30 sets the network device 12 that sends out the reply packet as a network device 12 that can be connected to the master network device 30 (as shown in FIG. 4), and then the data in a network device of each reply packet is read, and finally a name (that is CaS ID, wherein the CasID 1:1 and 1:2 respectively represent a same candidate network device 31 connected to the master network device 30 through an interface 33-1 which is IP-IF ID1:MAC D and an interface 33-2 which is IP-IF ID2:MAC F) and a physical address of the data of the network device (which is the physical address of all interfaces 33 of the network device, Local-MAC-Set) are read. The master network device receives a physical address (which is or IP-IF ID) of the interface 33 of the reply packet and sends out the physical address (which is CaS MAC) of the interface 22 of the network device of the reply packet, and saves the physical address (CaS MAC) correspondingly in a network device lookup table 4 of the master network device 30.

If it is determined that the network device lookup table 4 stores a plurality of physical addresses of the same network device, all network devices corresponding to the same physical address will be set as the same candidate network device 31, and other network devices corresponding to the physical addresses are set as different network devices 31 to complete setting the candidate network devices 31.

Referring to FIG. 5 for illustrating the result of setting a candidate network device 31, the master network device command switch (CS) comprises three interfaces 33 (1, 2 and 3) connected respectively to a network device CaS1 (Candidate Switch, CaS) and a candidate network device CaS2 through the network 2. The physical addresses of the three interfaces 33 of the candidate network device CaS1 are D, E and F. The candidate network device CaS2 is a level-2 network 2 device having a physical address of G and connected to a candidate network device CaS3 and a candidate network device CaS4 through the interfaces 33 having the physical addresses of E and F of the network device CaS1.

Step (205): The master network device 30 specifies at least one candidate network device 31 as a slave network device 32 of the master network device 30 (as shown in FIG. 6).

To specify the slave network devices 32, the management server 11 of the invention issues a specify instruction, such that if the master network device 30 receives the specify instruction, a physical address of the candidate network device 31 specified by the specify instruction will be read to produce a specify packet, and the physical address of the specify instruction and its candidate network device 31 are stored in the specify packet, so that the master network device 30 can send out the specify packet according to the physical address of the network device 31. If the specified candidate network device 31 receives the specify packet, a confirm packet will be produced. If the master network device 30 receives the confirm packet, the candidate network device 31 specified by the specify instruction will be set as the slave network device 32. Therefore, the management server 11 can directly manage the slave network devices 32 by the master network device, and administrators simply need to know the IP address of the master network device to send messages or manage other slave network devices 32.

Figure 6:
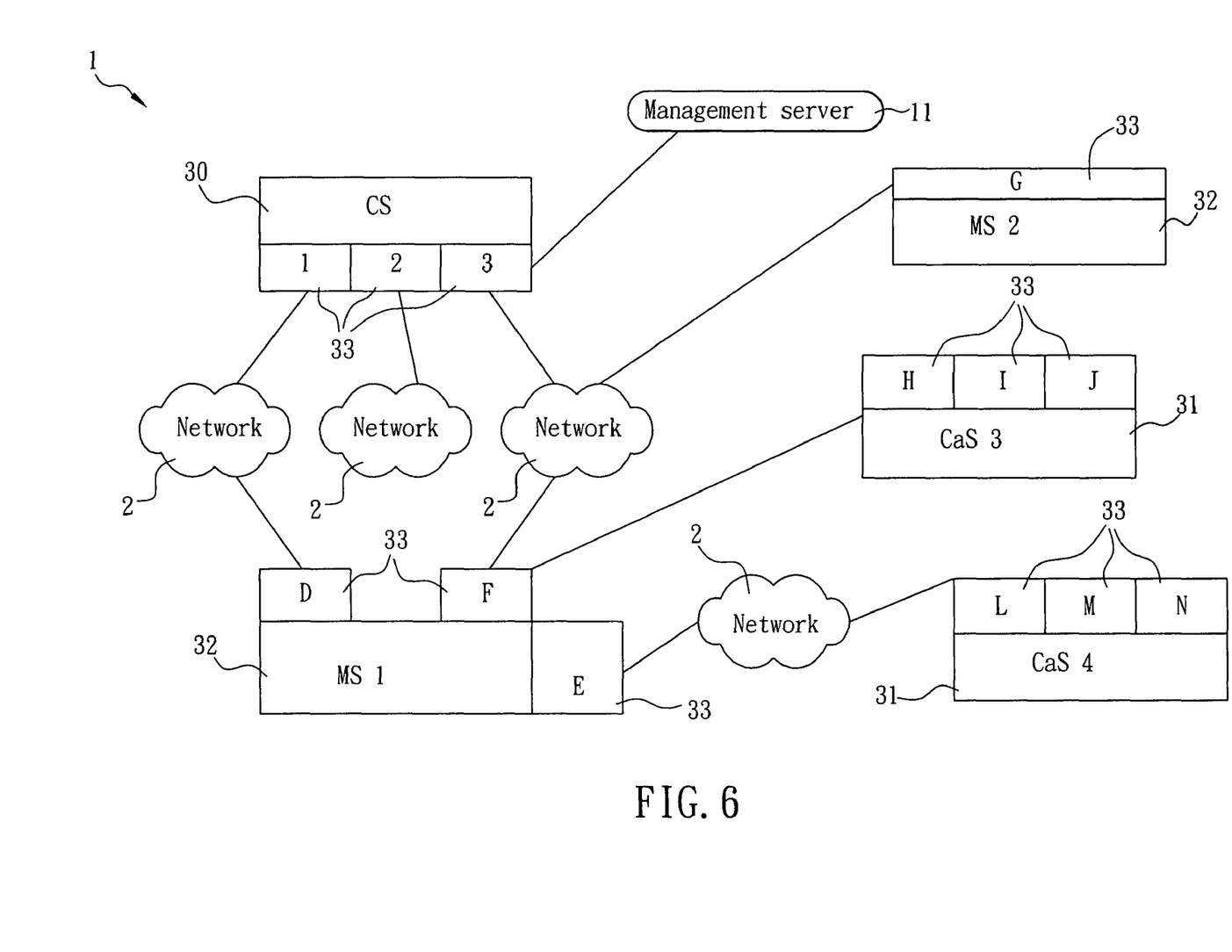
FIG. 6 is a schematic view of a network management system after searching a slave network device in accordance with the present invention.
Figure 7:
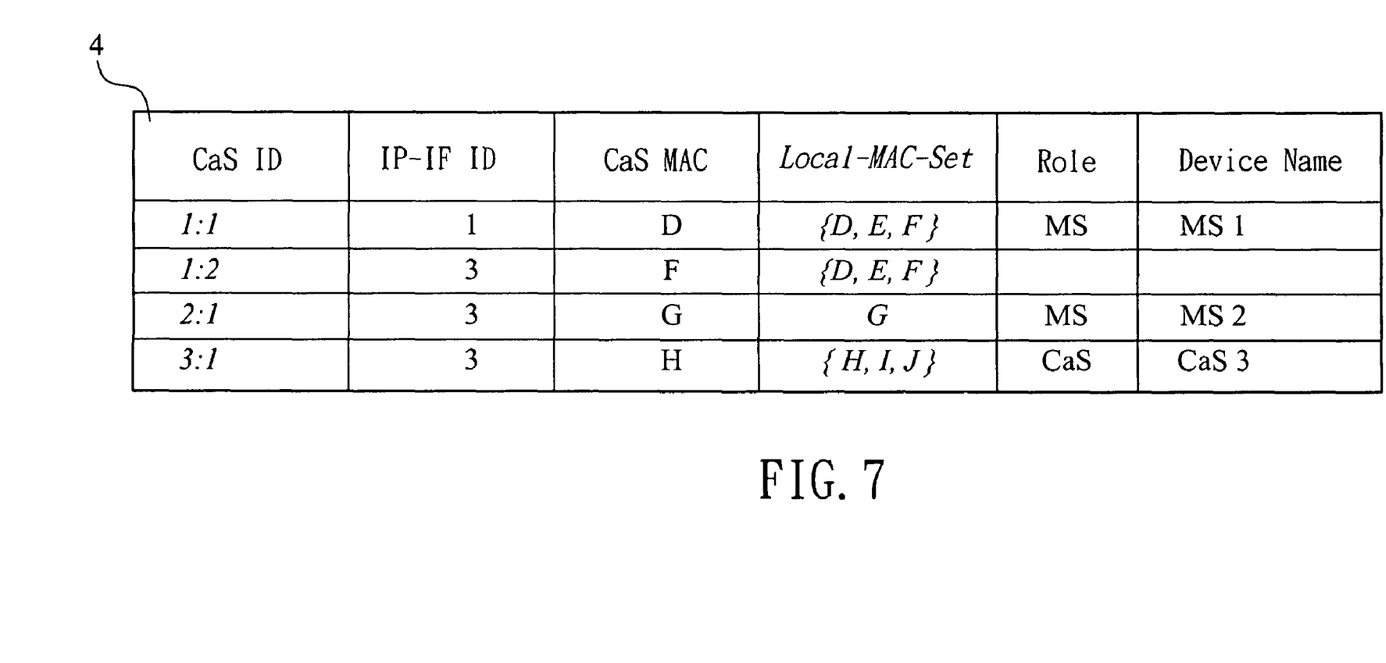
FIG. 7 is a second lookup table of network devices of the present invention.

Referring to FIG. 6 for illustrating a result of setting the foregoing slave network device 32, the three interfaces (1, 2 and 3) of the master network device CS (command switch, CS) are connected separately to the slave network device MS1 (member switch, MS) and the slave network device MS2 through the network 2. Referring to FIG. 7, the network device lookup table 4 sets the name of the network device 12 as the slave network device 32 by the foregoing setup procedure.

After going through the foregoing setup procedure, administrators not only simplify the network management procedure greatly, but also overcome the limitation of the network interface (or IP interface) and the virtual local area network (VLAN). Administrators can manage all nearby network devices through the IP address of a single network device and multiple interfaces.

Figure 8:
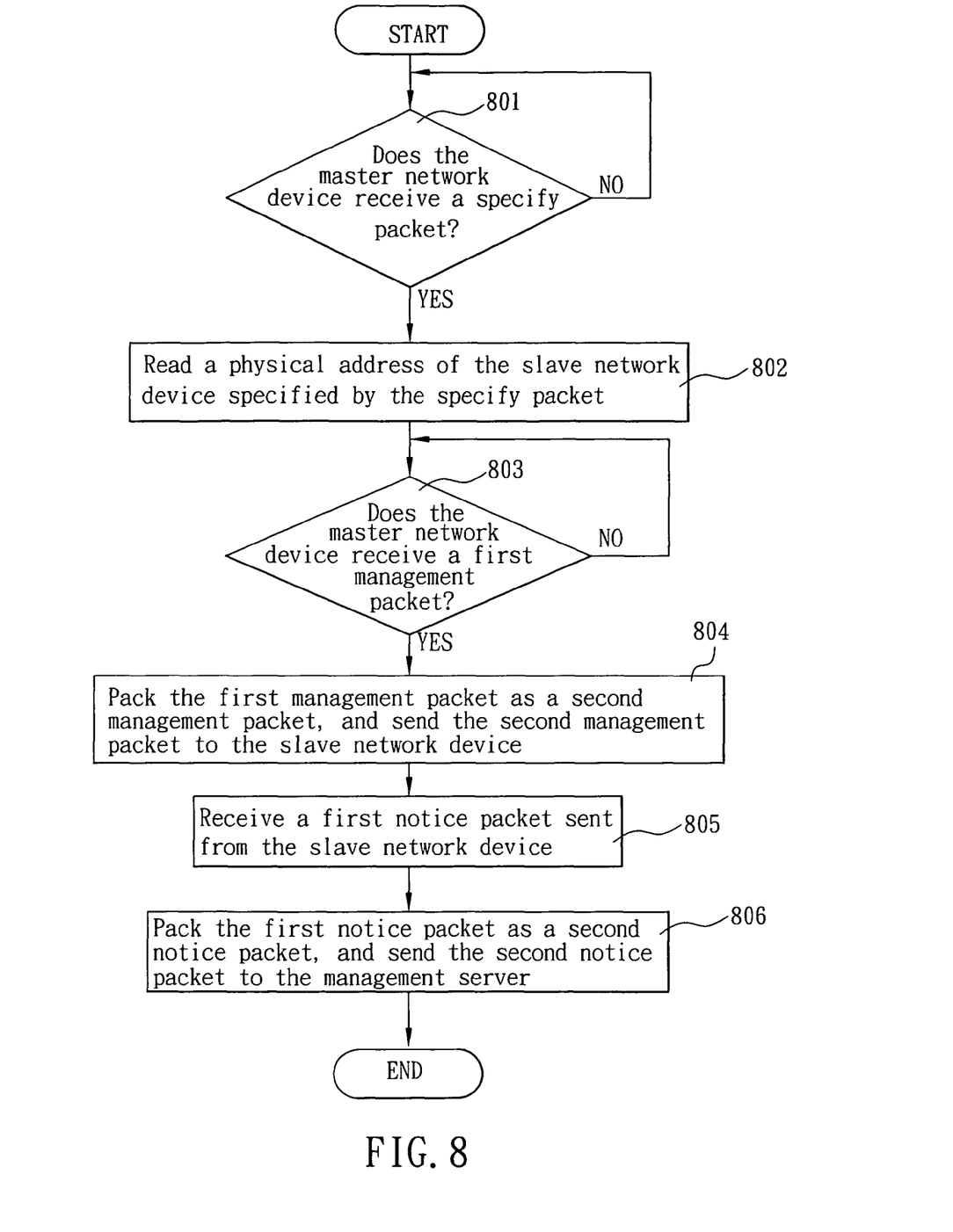
FIG. 8 is a flow chart of a management method of the present invention.
Figure 9:
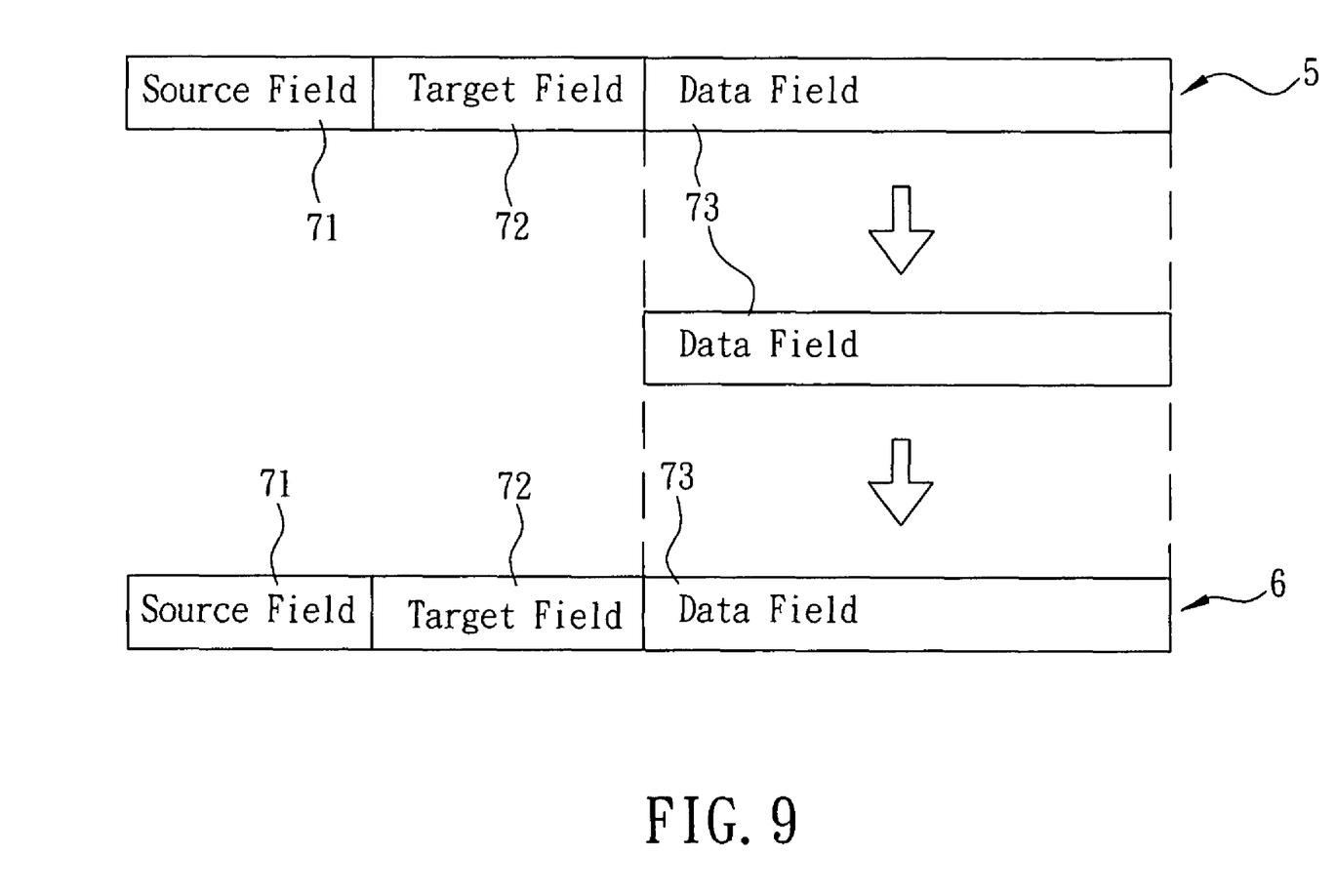
FIG. 9 is a schematic view of packing packets in accordance with the present invention.

The present invention relates to a method of managing a plurality of network devices through a single IP address, and the method is applied in a master network device 30, and the master network device 30 is connected a management server 1 and at least one slave network device 32 as shown in FIGS. 8 and 9, and the method comprises the steps of:

Step (801): determining whether or not the master network device 30 receives a specify packet sent from the management server 11; if yes, then go to Step (802), or else go to Step (801);

Step (802): reading a physical address of the slave network device 32 specified by the specify packet, wherein the specify packet in accordance with an embodiment of the present invention is provided for specifying all slave network devices 32 that are managed by the management server 11, such that the packets from the management server 11 can be sent to a desired slave network device 32;

Step (803): determining whether or not the master network device 30 receives a first management packet 5 sent from the management server 11; if yes, then go to Step (804), or else go to Step (803), wherein the first management packet 5 of the embodiment as shown in FIG. 9 comprises a source field 71, a target field 72 and a data field 73, and the source field 71 is provided for saving an IP address of the management server 11, and the target field 72 is provided for saving an IP address of the master network device 30, and the data field 73 is provided for saving a manage instruction of the slave network device 32;

Step (804): packing the first management packet 5 as a second management packet 6, and sending the second management packet 6 to the slave network device 32, wherein if the first management packet 5 is packed as the second management packet 6 (as shown in FIG. 9), the master network device 30 will produce a second management packet 6, and then will duplicate the manage instruction to a data field 73 of the second management packet 6 and also will duplicate the physical address of the interface 33 of the master network device 30 for sending the second management packet 6 into a source field 71 of the second management packet 6, and the physical address of the slave network device 32 specified by the specify packet into a target field 72 of the second management packet 6, and finally will send out the second management packet 6 specified by the slave network device 32 according to the physical address of the target field 72, such that after the slave network device 32 receives the second management packet 6, the purpose of managing the slave network devices 32 can be achieved by processing the manage instruction in the data field 73;

Step (805): receiving a first notice packet sent from the slave network device 32; wherein the first notice packet of the invention is produced after the slave network device 32 has processed the manage instruction, and the first notice packet also includes the source field 71, the target field 72 and the data field 73, and the source field 71 is provided for saving the slave network device 32 and sending out a physical address of the interface 33 of the first notice packet, and the target field 72 is provided for saving a physical address in the source field 71 of the management packet 6, and the data field 73 is provided for storing a notice data for noticing an administrator about the condition of managing the slave network device 32; and Step (806): packing the first notice packet as a second notice packet, and sending the second notice packet to the management server 11.

If the first notice packet is packed as the second notice packet in the present invention, the master network device 30 will produce a second notice packet and duplicate the second notice packet into a data field 73 of the second notice packet, and then will duplicate the IP address of the master network device 30 into a source field 71 in the second notice packet and the IP address of the management server 11 into a target field 72 of the second notice packet and finally will send the second notice packet to the management server 11 according to the IP address of the target field 72. Therefore, administrators can know about the condition of managing the slave network devices 32.

In summation of the description above, the present invention can use the method for managing and setting many network devices through a single IP address to achieve the following effects:

1. Administrators can manage all network devices connected to the master network device 30 by the IP address of the master network device 30.

2. It is not necessary to know the IP addresses of all network devices, so that the complicated setup procedure can be waived to greatly reduce the time required for setting up the network devices.

3. In the practical management, administrators can simplify the management procedure by directly managing the specific network devices similar to the master network device 30 without the need of considering the limitations of the network interface or local area network.

4. It is not necessary to change the design of existing network devices or network products to pack the manage packet and notice packet in accordance with the present invention, so that administrators can manage all network devices through multiple interfaces to save unnecessary additional costs and expenses.

While the invention herein disclosed has been described by means of specific embodiments, numerous modifications and variations could be made thereto by those skilled in the art without departing from the scope and spirit of the invention set forth in the claims.

What is claimed is:

1. A method for setting and managing network devices, which is applied to a network management system comprising a management server with a management server IP address and a plurality of network devices connected to said management server, comprising the steps of:
   conducting a first searching for said network devices by said management server and specifying one of said network devices connected to the management server as a master network device by said management server, wherein said master network device with a master network device IP address and comprises a first network interface with a first physical address; and conducting a second search for said network devices by said master network device upon receiving a search instruction from said management server, which comprises the steps of:

producing a broadcast packet by said master network device;

sending said broadcast packet from said first interface of said master network device to said network devices connected to said first interface;

setting said network devices that send reply packets to said master network device as candidate network devices;

specifying one of said candidate network devices as a slave network device by said master network device, wherein said slave network device has a second physical address;

receiving and reading a specify packet with said second physical address sent from the management server at said master network device;

receiving a first management packet sent from the management server at said master network device;

repacking the first management packet to a second management packet by said master network device, and sending the second management packet to the slave network device by said master network device;

receiving a first notice packet sent from the slave network device at said master network device; and repacking the first notice packet to a second notice packet by said master network device, and sending the second notice packet to the management server by said master network device.

2. The method for setting and managing network devices as claim 1, wherein said master network device packs said first management packet to said second management packet and sends said second management packet to said slave network device by a procedure comprising the steps of:

reading a manage instruction in a first data field of said first management packet, and inserting said manage instruction into a second data field of said second management packet;

reading a target physical address in a first target field of said first management packet, and inserting said target physical address into a second target field of said second management packet;

inserting said first physical address of said first interface into a second source field of said second management packet; and sending said second management packet to said specified slave network device according to said target physical address of said target field.

3. The method for setting and managing many network devices as claim 1, wherein said master network device packs said first notice packet as said second notice packet and sends said second notice packet to said management server by a procedure comprising the steps of:

reading a first notice data in a first data field of said first notice packet, and inserting said first notice data into a second data field of said second notice packet;

inserting said management server IP address into a target field of said second notice packet;

inserting said master network device IP address into a source field of said second notice packet; and sending said second notice packet to said management server.

4. The method for setting and managing network devices as claim 1, wherein said master network device further comprises a second interface with a third physical address.

5. The method for setting and managing network devices as claim 2, wherein said target physical address is said second physical address.

* * * * *